(12) United States Patent
Pohlmann

(10) Patent No.: US 10,044,598 B2
(45) Date of Patent: Aug. 7, 2018

(54) NETWORK PROXYING TECHNOLOGY

(75) Inventor: Frank Pohlmann, Fellbach (DE)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/130,415

(22) PCT Filed: Jul. 10, 2012

(86) PCT No.: PCT/EP2012/063481
§ 371 (c)(1),
(2), (4) Date: Dec. 31, 2013

(87) PCT Pub. No.: WO2013/007722
PCT Pub. Date: Jan. 17, 2013

(65) Prior Publication Data
US 2014/0146832 A1   May 29, 2014

(30) Foreign Application Priority Data
Jul. 11, 2011  (EP) .................................... 11173482

(51) Int. Cl.
*H04L 12/715*  (2013.01)
*H04L 12/28*   (2006.01)
*H04L 29/12*   (2006.01)

(52) U.S. Cl.
CPC .......... *H04L 45/04* (2013.01); *H04L 12/2832* (2013.01); *H04L 61/6068* (2013.01)

(58) Field of Classification Search
CPC ............................. H04L 12/2832; H04L 45/04
USPC ....................................................... 370/420
See application file for complete search history.

(56) References Cited

U.S. PATENT DOCUMENTS

| | | | |
|---|---|---|---|
| 6,463,307 B1* | 10/2002 | Larsson | H04B 1/1615 455/343.4 |
| 8,661,277 B2* | 2/2014 | Tokoro | 713/323 |
| 8,781,442 B1* | 7/2014 | Link, II | 455/411 |
| 2004/0039906 A1* | 2/2004 | Oka | H04L 63/065 713/156 |
| 2004/0246961 A1* | 12/2004 | Dai | H04L 12/12 370/392 |
| 2007/0004436 A1 | 1/2007 | Stirbu | |
| 2008/0019392 A1* | 1/2008 | Lee | H04L 12/66 370/467 |

(Continued)

FOREIGN PATENT DOCUMENTS

| | | |
|---|---|---|
| CN | 1323495 A | 11/2001 |
| CN | 1823495 A | 8/2006 |

(Continued)

OTHER PUBLICATIONS

Hitachi, Ltd., et al., High-Definition Multimedia Interface, Ver. 1.3a, Nov. 10, 2006 (excerpt attached).*

(Continued)

*Primary Examiner* — Mang Yeung
*Assistant Examiner* — Peter G Solinsky
(74) *Attorney, Agent, or Firm* — Oblon, McClelland, Maier & Neustadt, L.L.P.

(57) ABSTRACT

A network device including a first network interface adapted to communicate with at least one further network device within a sub-network, and a proxy module adapted to provide control and information retrieval functionality relating to the at least one further network device to network devices outside the sub-network.

23 Claims, 2 Drawing Sheets

(56) References Cited

U.S. PATENT DOCUMENTS

| | | | |
|---|---|---|---|
| 2008/0098241 A1* | 4/2008 | Cheshire | G06F 1/3209 713/300 |
| 2008/0155635 A1 | 6/2008 | Johnson et al. | |
| 2008/0180551 A1* | 7/2008 | Koike | 348/231.99 |
| 2008/0292007 A1* | 11/2008 | Lida | H04L 27/0008 375/257 |
| 2008/0301322 A1* | 12/2008 | Horibe | H04L 12/12 709/245 |
| 2009/0074040 A1* | 3/2009 | Lida et al. | 375/220 |
| 2009/0210539 A1* | 8/2009 | Funabiki et al. | 709/228 |
| 2009/0285138 A1* | 11/2009 | Thomas | H04N 5/4403 370/310 |
| 2009/0296731 A1* | 12/2009 | Lida | G06F 3/1454 370/449 |
| 2010/0165912 A1 | 7/2010 | Funabiki et al. | |
| 2010/0223370 A1 | 9/2010 | Kase et al. | |
| 2010/0240400 A1* | 9/2010 | Choi | 455/458 |
| 2010/0250979 A1* | 9/2010 | Sugimori | H04N 21/4183 713/310 |
| 2010/0271948 A1* | 10/2010 | Challapali | H04W 72/085 370/235 |
| 2010/0309845 A1* | 12/2010 | Jeon | H04W 72/04 370/328 |
| 2010/0329223 A1* | 12/2010 | Matsumura | G09G 5/006 370/338 |
| 2011/0026613 A1* | 2/2011 | Mari | G06F 1/3237 375/259 |
| 2011/0113268 A1* | 5/2011 | Matsushita | H04L 12/12 713/310 |
| 2011/0161447 A1* | 6/2011 | Lin | H04N 21/42204 709/206 |
| 2011/0255692 A1* | 10/2011 | Soliman | H04L 63/0492 380/270 |
| 2011/0316962 A1* | 12/2011 | Doi | H04N 21/43635 348/14.01 |
| 2011/0317587 A1* | 12/2011 | Lida | H04L 12/2832 370/254 |
| 2012/0012387 A1* | 1/2012 | Horan | H01B 11/00 174/74 R |
| 2012/0032876 A1* | 2/2012 | Tabe | 345/156 |
| 2012/0057853 A1* | 3/2012 | Huber et al. | 386/292 |
| 2012/0106658 A1* | 5/2012 | Muth | H04W 52/0212 375/259 |
| 2012/0117601 A1* | 5/2012 | Yeh et al. | 725/42 |
| 2012/0151028 A1* | 6/2012 | Lu | H04W 4/18 709/223 |
| 2012/0185580 A1* | 7/2012 | Detert | H04L 67/125 709/223 |
| 2012/0281696 A1* | 11/2012 | Pohlmann | H04L 12/12 370/390 |
| 2012/0287942 A1* | 11/2012 | Peng | G09G 5/006 370/465 |
| 2012/0331139 A1* | 12/2012 | Yamada | H04L 12/2816 709/224 |
| 2013/0077640 A1* | 3/2013 | Jiang | G02B 6/4274 370/464 |
| 2013/0154812 A1* | 6/2013 | Richardson | G08C 19/00 340/12.52 |

FOREIGN PATENT DOCUMENTS

| | | |
|---|---|---|
| CN | 101379777 A | 3/2009 |
| EP | 2 196 914 | 6/2010 |
| WO | WO 2005/020505 A1 | 3/2005 |

OTHER PUBLICATIONS

International Search Report dated Sep. 26, 2012 in PCT/EP12/063481 Filed Jul. 10, 2012.

Combined Chinese Office Action and Search Report dated May 17, 2016 in Patent Application No. 201280034495.9 (with English translation of categories of cited documents).

Third Office Action issued in Chinese Application No. 201280034495.9, dated May 18, 2017. (with computer generated English translation) 37 pages.

Extended European Search Report dated Jun. 3, 2017 in Application No. EP 17 17 1210 (9 pages).

* cited by examiner

NETWORK PROXYING TECHNOLOGY

CROSS-REFERENCE TO RELATED APPLICATION

The present application is based on PCT filing PCT/EP2012/063481 filed Jul. 10, 2012, and claims priority to EP patent application number 11173482.8 filed Jul. 11, 2011, the entire contents of each of which are incorporated herein by reference.

FIELD OF INVENTION

The present invention relates to a network device, a network comprising at least two network devices and a method of providing communication capability between a network and another overall network.

BACKGROUND OF THE INVENTION

In the field of consumer electronics, the communication capability of single devices, like set-top boxes, Blu-ray players, TV sets, etc., increases continuously even beyond the boundaries of a single network (sub-network) comprising a TV set and for example a set-top box. The known standard HDMI (High Definition Multimedia Interface) version 1.4 and particularly the CEC (Consumer Electronics Control) protocol and the HDMI Ethernet Channel (HEC) allow a very sophisticated communication between single devices in a sub-network or even in an overall network comprising for example two sub-networks, etc.

Beside these communication capabilities and the demand that every device in a network is accessible, there is also a demand for a reduction of power consumption. In particular, the network devices should be able to be switched in a low-power consumption mode if not in operation. The HDMI specification 1.4 provides a low-power consumption communication channel, namely the CEC channel mentioned above. The CEC channel for example allows to switch a device back from the low-power consumption mode into the normal operation mode. Nevertheless, network devices being in a low-power consumption mode are not accessible e.g. by any network devices outside of the sub-network.

BRIEF SUMMARY OF INVENTION

In view of the above, it is an object of the present invention to provide a network device and a network comprising at least two network devices which allow access to/control of network devices within the network by any network device outside of this network even if the respective network device is in a low-power consumption mode.

According to an aspect of the present invention there is provided a network device comprising a first network interface adapted to communicate with at least one further network device within a sub-network, and a proxy module adapted to provide control, notification and information retrieval functionality relating to said at least one further network device to network devices outside said sub-network.

According to a further aspect of the present invention there is provided a network comprising at least two network devices being connected with each other, at least one of which being a network device as mentioned above (referred to as proxy network device), wherein one of said network devices is connected with another network.

According to a further aspect of the present invention there is provided a method of providing communication capability between a network according to the present invention and another overall network with the steps:

by the proxy network device: requesting or being notified of data from the remaining network devices of the sub-network relating to the functionality of the respective network device and storing said data;

by the proxy network device: submitting data in response to a request from a network device of the overall network addressed to any one of the network devices of the sub-network.

Preferred embodiments of the invention are defined in the dependent claims. It shall be understood that the claimed network and the claimed method have similar and/or identical preferred embodiments as the claimed network device and as defined in the dependent claims.

The present invention is based on the idea to provide a network device in a sub-network with a proxy module which "knows" the functionality of the other network devices in the respective sub-network and other information to respond to requests coming from network devices outside the sub-network. In this respect, the requests to respond to may be addressed to any network device within the sub-network or directly to the proxy network device. In other words, the present invention provides a technology that makes it possible to keep many devices in a low-power consumption state while simultaneously maintaining the full capability to control and/or retrieve information from those devices. The advantage of the present invention becomes even more important when network devices such as TV sets, Blu-ray players or DVD players are connected to a communication network. Such devices are expected to have a very low power consumption, e.g. when not actively used. Requests to such network devices can be processed by the network device having the proxy module (proxy network device) and the proxy network device could then—if necessary—communicate for example via the CEC channel with the TV set as to, for example, wake up this network device.

BRIEF DESCRIPTION OF DRAWINGS

These and other aspects of the present invention will be apparent from and explained in more detail below with reference to the embodiments described in hereinafter. In the drawings.

DETAILED DESCRIPTION OF THE INVENTION

The present invention is now explained with reference to an embodiment using HDMI for connecting network devices within a sub-network. However, it is to be noted that the invention is not limited to networks using HDMI.

Figure 1:
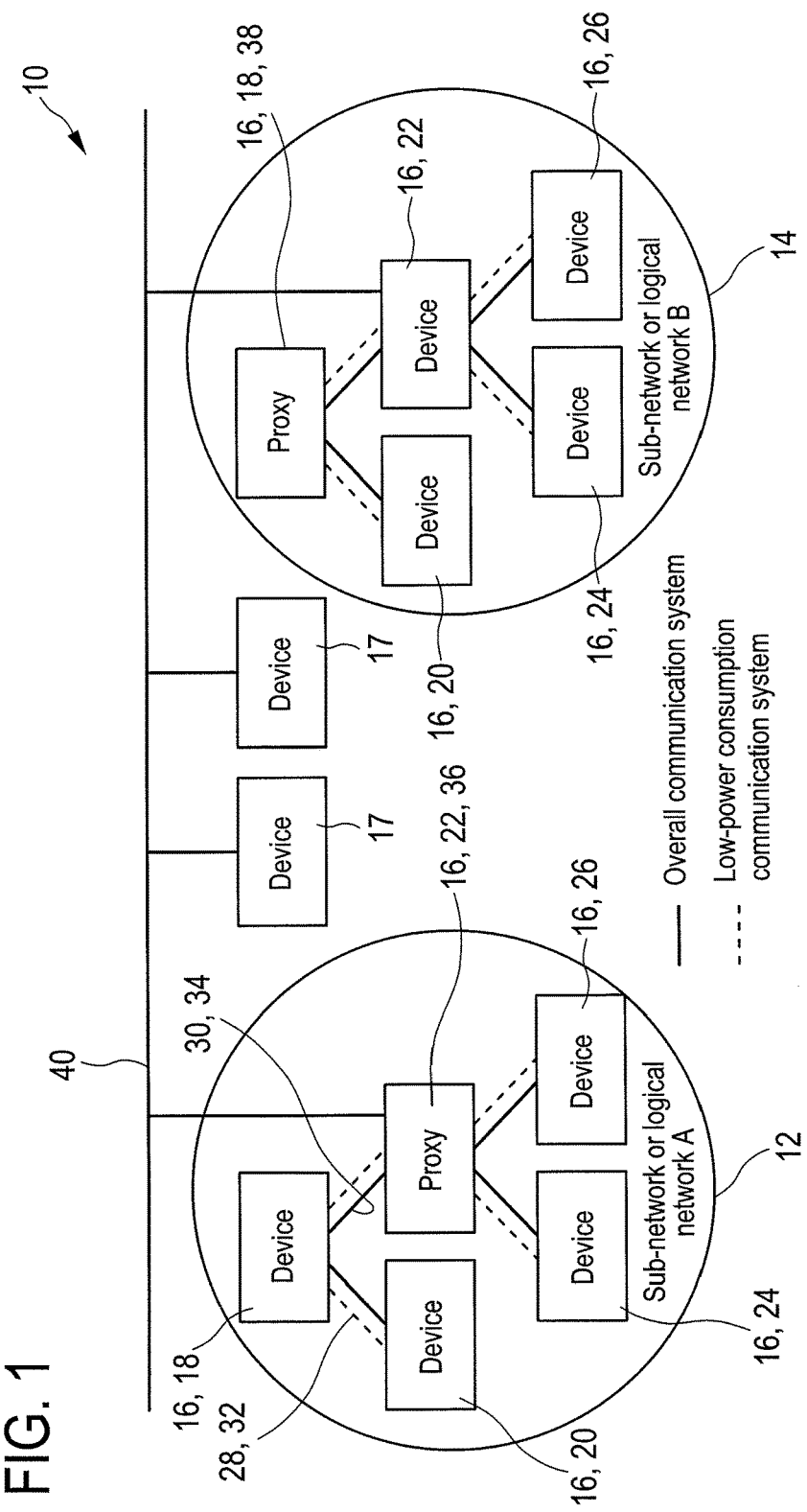
FIG. 1 shows a schematic block diagram of an overall network comprising two sub-networks.

In FIG. 1 an overall network is schematically shown and designated with reference numeral 10. The overall network 10 may comprise a plurality of network devices wherein the groups of network devices may be organized as sub-networks. In FIG. 1, two sub-networks are shown and designated with reference numerals 12 and 14. The network devices forming the respective sub-network 12, 14 are surrounded by a circle for illustration purposes.

It is to be noted that the sub-networks 12, 14 may also be organized as logical networks.

Each sub-network 12, 14 comprises at least two network devices 16. In the present invention, the network devices 16 are equipped with an HDMI interface which enables a connection of the network devices 16 for communication purposes in, for example, a tree structure as shown in FIG. 1. Typically, such a HDMI sub-network 12, 14 comprises a TV set 18 which could be connected via a HDMI cable with a set-top box 20 and an AV receiver 22. The AV receiver 22 may in turn be connected via a HDMI cable with a DVD player 24 and a Blu-ray player 26. It is to be noted here that this is just an example of a HDMI sub-network and other combinations of consumer electronic devices equipped with HDMI interfaces are conceivable.

In FIG. 1, the network devices 16 of a sub-network 12, 14 are connected via two lines 28, 30 (which are incorporated in the HDMI cable) symbolizing a CEC channel 32 and a HEC channel 34. It is to be noted here that this is just an example connection and that other combinations may exist (e.g. no HEC channel 34) due to the existence of legacy devices and legacy cables.

Both channels are defined in the HDMI standard version 1.4 and it is referred for further details to the respective HDMI standard document. Briefly summarized, the CEC channel (Consumer Electronics Control) describes a communication protocol that provides high level control functions between all of the various consumer electronic devices (network devices) 16 in a sub-network environment. Particularly, CEC provides a number of features designed to enhance the functionality and interoperability of network devices within an HDMI network. One function, for example, is "one touch play" which allows a network device to be played and become the active source with a single button press, or the function "timer programming" which allows the user to program the timers in a recording device from an EPG running on a TV set, as to mention just a few functions.

The connection of the network devices of a sub-network via a CEC channel 32 allows to build up a low-power consumption communication network because it is possible to operate the respective network devices in the CEC network system in a low-power consumption mode. Further details are disclosed in EP application EP 11 164 466.2, filed on May 2, 2011, the content of which is incorporated by reference.

The HEC channel 34 provides an Ethernet based channel enabling communication between the network devices using the Ethernet standard (IEEE 802.3 standard). In contrast to the CEC channel, the HEC channel 34 allows transmission of high speed data signals; in other words the transmission rate of the HEC channel is much higher than the transmission rate of the CEC channel. Further, in contrast to the CEC channel, the HEC channel operation causes a significant increase of a device's power consumption.

Within both sub-networks shown in FIG. 1, there is one network device 16 having a further interface, preferably an Ethernet interface, enabling communication with the overall network 10, that is with network devices outside the respective sub-network 12, 14. In the following, these particular network devices 16 are referred to as proxy network devices and are designated with reference numerals 36 and 38, respectively.

In the embodiment shown in FIG. 1, the proxy network device 36 of the sub-network 12 is the AV receiver 22, and the proxy network device 38 in the sub-network 14 is the TV set 18.

By using the proxy network device, the network devices 16 of a respective sub-network are able to communicate with, for example, a proxy network device of the other sub-network 14 or network devices 17 not being part of a sub-network, even when a communication via the overall network is not possible. Such network devices 17 may for example be personal computers.

Although the proxy network devices 36, 38 and the devices 17 are connected via a line 40 with each other symbolizing a wired Ethernet line, a wireless connection would also be conceivable.

The network structure shown in FIG. 1 allows a communication of any network device 16 with any other network device 16 via the overall network regardless whether this network device 16 is part of the same sub-network or not. However, such a communication requires that the respective network devices' connection to the overall network is enabled, which is usually the case in a normal power consumption mode. In particular, the destination, which is the target network device for a message, has to be in such a normal power consumption mode as to be able to respond and process to this message.

Figure 2:
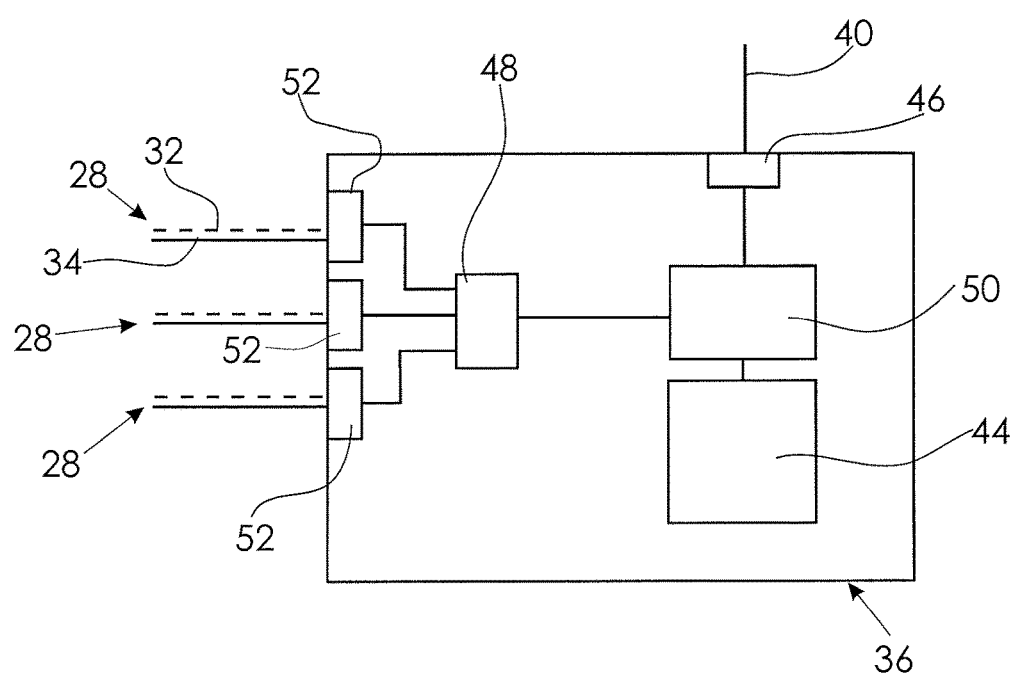
FIG. 2 shows a schematic block diagram of a network device having a proxy module.

In order to overcome this restriction, the proxy network devices 36, 38 are provided with a proxy module 44 as shown in the schematic block diagram of FIG. 2. The proxy module 44 is realized in software and/or hardware within the proxy network device 36, 38 and adds additional functionality to the respective network device. The proxy module 44 is in communication with an Ethernet interface 46 and an HDMI interface 48 via a central processor 50 of the proxy network device 36.

As it is further shown in FIG. 2, the HDMI interface 48 supplies several HDMI sockets 52 for connecting respective HDMI cables 28. It is to be noted that the block diagram of FIG. 2 merely shows the elements of the network device which are necessary for explaining the present invention. It is without saying that the proxy network device 36, for example an AV receiver 22, comprises further electronic components not shown in FIG. 2.

The proxy module 44 comprises a first element which is adapted to listen to the messages/data received via the Ethernet interface 46. This element is also adapted to recognize or filter those messages which are addressed to the proxy network device 36 itself or to any other network device being part of the sub-network 12 of the proxy network device 36.

The information about the participants, namely the network devices 16, of the sub-network 12 is retrieved by a second element of the proxy module 44. This information is stored in a memory for example as a lookup table and is continuously updated by the proxy module 44.

Hence, the proxy module 44 can evaluate by using the lookup table whether a received message is addressed to a network device of its sub-network.

The mentioned lookup table stored in the proxy module 44 may contain general device information (e.g. name, vendor, icons) and information about the offered functionalities of the network devices in the sub-network. This information is also updated continuously or alternatively upon connecting a new network device 16 to the sub-network 12.

In general, the proxy network device 36 uses the information stored in the lookup table to check whether a message received via the Ethernet interface 46 from a network device outside of the sub-network was either addressed to a device within the sub-network that is in low-power consumption mode and therefore unable to respond or addressed to the proxy network device on behalf of a device within the sub-network.

Further, the proxy module 44 will respond to such a message appropriately. It might, for example, respond by itself whenever it has all necessary information, or it might wake-up the overall network connection of the network device 16 of the respective sub-network 12 via the CEC channel 32 and either inform this device about the received message or inform the device outside of the sub-network about the enabled overall network connection (note that this might be also done implicitly by the network device 16).

Hence, the sub-network 12 with the proxy network device 36 provides full operation although only the proxy network device has to be in a normal power consumption mode. All other network devices of the sub-network could be in a low power consumption mode.

For example, if the user of the TV set 18 of the second sub-network 14 requests a video streaming from the Blu-ray player 26 of the first sub-network 12, the TV set 18 transmits a message addressed to the network device, namely the Blu-ray player 26 of the sub-network 12. Although this Blu-ray player 26 is in a low-power consumption mode, the proxy network device 36 receives this message and recognizes that it is addressed to a network device of its sub-network that is in a low-power consumption mode. The proxy network device 36 can respond to the received message and can then carry out the further steps mentioned above, namely to bring the Blu-ray player 26 in the normal power consumption mode, to inform it about the received message and therefore to cause the video streaming action to the TV set 18 of the second sub-network 14.

Hence, the concept of a proxy module as defined above, allows to support low power consumption of network devices while simultaneously maintaining the whole control and/or information retrieval functionality within a sub-network. The proxy network device provides the connection to the overall network for its sub-network, as shown in FIG. 1. However, it is also conceivable that the proxy network device is a network device within the sub-network not being directly connected to the overall network.

In a particular embodiment, each proxy network device is interconnected with all other devices within its sub-network, wherein the interconnection is either established by the overall communication system, like Ethernet, by a communication system that works in a low-power consumption mode, like CEC, or preferably by both such communication systems, namely Ethernet and CEC as shown in FIG. 1. The low-power consumption communication system (like CEC) may only interconnect devices within a particular sub-network instead of interconnecting network devices throughout the overall communication system.

In case that a proxy network device is interconnected to one or more devices within its sub-network via a low-power consumption communication system, like CEC, and the overall communication system to one or more of those devices is disabled (that is that no Ethernet channel is provided or enabled), it is the proxy network device that maintains the connection to the overall communication system for those network devices via the proxy functionality of the proxy module 44.

Upon request from another network device within the overall communication system, each proxy network device provides information and/or control functionality of all other participating network devices within its sub-network. Each proxy network device may either retrieve the appropriate information from the devices within its sub-network after request reception or beforehand when appropriate (for example when the network devices are fully powered on).

Each proxy network device may be able to control the power consumption mode of each network device within its sub-network and upon control or information request reception, each proxy network device may decide whether or not it is appropriate to change the power consumption mode of one or more network devices within its sub-network.

Each network device within a sub-network may update the information stored in the proxy module of a proxy network device at any time whether the update is communicated via the overall communication system, like Ethernet, or via a low-power consumption communication system, like CEC.

Each proxy network device detects whenever the connection of its sub-network to the overall network is activated and deactivated and enables or disables the proxy functionality of the proxy module appropriately. The proxy network device may then advertise its proxying functionality appropriately to both, the overall network and its sub-network.

When possible and appropriate, network devices within the overall communication network may at any time directly communicate with network devices within a particular sub-network without the usage of the proxying functionality of the proxy network device. Each proxy network device may maintain its proxying functionality even when the proxy network device itself is set to a low-power consumption mode in which the proxying functionality offered by the proxy module is not immediately accessible. In this case that proxy network device will provide appropriate mechanisms that provide the possibility for the proxying functionality to be woken up from either network devices within the overall communication network or from devices within the proxy network device's sub-network. Such mechanisms are, for example, disclosed in the above-mentioned European patent application EP 11 164 466.2, filed on May 2, 2011, the content of which is incorporated herewith by reference.

With respect to FIG. 1, a particular implementation has been described for illustration purposes. It is without saying that other implementations are also conceivable for example in the following environments:

a) a local area network (LAN) consisting of network devices like personal computers, switches, servers and additionally of consumer electronic (CE) devices such as TV sets, Blu-ray players and audio amplifiers.

b) Several consumer electronic devices are interconnected with each other via HDMI cables that incorporate an Ethernet channel and a CEC line/channel. Those devices and their interconnections create both, HDMI Ethernet channel (HEC) network and a low-power consumption network, called CEC (Consumer Electronics Control).

c) Each HEC network incorporates one connection to the overall network (the LAN).

d) Within each HEC network there is one network device (preferably the network device with the connection to the LAN) that provides the proxying functionality for said HEC network, meaning that this network device is provided with the proxy module as mentioned and described above.

e) Each network device within a HEC network that is not the proxy network device may be set to a low-power consumption mode in which only the communication via the CEC channel is still working.

f) Within such an environment, the proxy network device communicates with the other devices within its HEC network via the CEC channel whenever the other devices are in a low-power consumption mode.

To sum up, the present invention provides the possibility to reduce the power consumption of many devices within a communication network while maintaining the whole control and/or information retrieval capability of those network devices. Network devices may even be set to a power state in which the overall communication system is not working anymore but in which a low-power consumption communication system is used to maintain the devices' networking capability via proxying functionality.

The invention has been illustrated and described in detail in the drawings and foregoing description, but such illustration and description are to be considered illustrative or exemplary and not restrictive. The invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

The invention claimed is:

1. A network device comprising
circuitry configured to
communicate with at least one further network device within a sub-network that includes two or more network devices that have different functionalities, the at least one further network device being at least one network device, the circuitry being configured to communicate with the at least one further network device over a first communication protocol and a second communication protocol, the second communication protocol having a higher data speed and a higher power consumption than the first communication protocol;
receive a message for said at least one further network device from a network outside said sub-network;
make a determination of whether a power state of said at least one further network device is a first power state in which said at least one further network device can act on the message or a second power state in which said at least one further network device cannot act on the message;
select the first communication protocol or the second communication protocol for communication with the at least one further network device in accordance with the power state of the at least one further network device; and
act on the message in accordance with the determination and one of the functionalities associated with the at least one further network device,
wherein the circuitry is controllable to operate in the first power state when set to operate in the first power state, to operate in the second power state when set to operate in the second power state, to receive a command from another network device to switch from the second power state to the first power state and, in response to the command, to switch from the second power state to the first power state, and
wherein the circuitry is configured to receive the message regardless of whether the circuitry is operating in the first power state or the second power state.

2. The network device of claim 1, wherein the circuitry is further configured to communicate with network devices outside said sub-network in an overall network.

3. The network device of claim 2, wherein said circuitry is configured to allow communication according to the Ethernet standard.

4. The network device of claim 1, wherein said circuitry is configured to allow communication via an HDMI Consumer Electronics Control channel (CEC).

5. The network device of claim 1, wherein said circuitry is configured to allow communication via an HDMI Ethernet Channel (HEC).

6. The network device of claim 1, wherein said circuitry is configured to control the power state of said at least one further network device in the subnetwork.

7. The network device of claim 1, wherein said circuitry is configured to detect any communication between a network device of the sub-network and a network device of an overall network.

8. The network device of claim 1, wherein said circuitry is configured to answer requests from network devices of an overall network addressed to said at least one further network device of said sub-network.

9. The network device of claim 1, wherein said circuitry is configured to retrieve and store general device and functionality information from said at least one further network device of the sub-network.

10. The network device of claim 9, wherein said circuitry is configured to accept an update of said stored general device and functionality information caused by said at least one further network device.

11. The network device of claim 1, wherein said circuitry is operative even if said at least one further network device is in said second power state.

12. The network of claim 1, wherein said at least one further network device is a consumer electronic device.

13. A network comprising at least two network devices being connected with each other, at least one of which being a proxy network device, wherein one of said at least two network devices is connected with another network, and wherein the proxy network device comprises:
circuitry configured to
communicate with at least one further network device within a sub-network that includes two or more network devices that have different functionalities, the at least one further network device being at least one network device, the circuitry being configured to communicate with the at least one further network device over a first communication protocol and a second communication protocol, the second communication protocol having a higher data speed and a higher power consumption than the first communication protocol;
receive a message for said at least one further network device from a network outside said sub-network;
make a determination of whether a power state of said at least one further network device is a first power state in which said at least one further network device can act on the message or a second power state in which said at least one further network device cannot act on the message;
select the first communication protocol or the second communication protocol for communication with the at least one further network device in accordance with the power state of the at least one further network device; and act on the message in accordance with the determination and one of the functionalities associated with the at least one further network device,
wherein the circuitry is controllable to operate in the first power state when set to operate in the first power state, to operate in the second power state when set to operate in the second power state, to receive a command from another network device to switch from the second power state to the first power state and, in response to the command, to switch from the second power state to the first power state, and
wherein the circuitry is configured to receive the message regardless of whether the circuitry is operating in the first power state or the second power state.

14. The network of claim 13, wherein the one of said at least two network devices that is connected with said another network is said proxy network device.

15. The network of claim 13, wherein said network is a HDMI/CEC network.

16. The network of claim 13, wherein said another network is a local area network, LAN.

17. The network of claim 13, wherein at least one of said at least two network devices is adapted to be settable to said second power state.

18. The network of claim 17, wherein all of said at least two network devices of said network except said proxy network device are settable to said second power state.

19. The network of claim 18, wherein said network devices settable to said second power state are adapted to communicate with each other via a low-power communication line.

20. A method of providing communication capability between a first network and a second network, the first network comprising at least two network devices being connected with each other, at least one of which being a proxy network device, wherein one of said at least two network devices is connected with the second network, and wherein the proxy network device comprises:
circuitry configured to
communicate with at least one further network device within a sub-network that includes two or more network devices that have different functionalities, the at least one further network device being at least one network device, the circuitry being configured to communicate with the at least one further network device over a first communication protocol and a second communication protocol, the second communication protocol having a higher data speed and a higher power consumption than the first communication protocol:
receive a message for said at least one further network device from a network outside said sub-network:
make a determination of whether a power state of said at least one further network device is a first power state in which said at least one further network device can act on the message or a second power state in which said at least one further network device cannot act on the message;
select the first communication protocol or the second communication protocol for communication with the at least one further network device in accordance with the power state of the at least one further network device; and
act on the message in accordance with the determination and one of the functionalities associated with the at least one further network device,
wherein the circuitry is controllable to operate in the first power state when set to operate in the first power state, to operate in the second power state when set to operate in the second power state, to receive a command from another network device to switch from the second power state to the first power state and, in response to the command, to switch from the second power state to the first power state, and
wherein the circuitry is configured to receive the message regardless of whether the circuitry is operating in the first power state or the second power state,
the method comprising:
by the proxy network device:
requesting and/or being notified of data from others of said at least two network devices of the sub-network relating to general device information and/or the functionality of the respective network device and storing said data; and
by the proxy network device:
submitting data in response to a request from a network device of the overall network addressed to any one of the at least two network devices of the sub-network.

21. Method of claim 20, wherein said step of requesting data is repeated according to a predetermined plan.

22. Method of claim 20, wherein at least one of the at least two network devices is set in said second power state and said proxy network device responds to requests directed to the at least one of the at least two network devices that is in the second power state and received from the overall network.

23. A non-transitory computer-readable medium carrying instructions that, when executed on a computing device, control the computing device to carry out a method of providing communication capability between a first network and a second network, the first network comprising at least two network devices being connected with each other, at least one of which being a proxy network device, wherein one of said at least two network devices is connected with the second network, and wherein the proxy network device comprises:
circuitry configured to communicate with at least one further network device within a sub-network that includes two or more network devices that have different functionalities, the at least one further network device being at least one network device, the circuitry being configured to communicate with the at least one further network device over a first communication protocol and a second communication protocol, the second communication protocol having a higher data speed and a higher power consumption than the first communication protocol;
receive a message for said at least one further network device from a network outside said sub-network;
make a determination of whether a power state of said at least one further network device is a first power state in which said at least one further network device can act on the message or a second power state in which said at least one further network device cannot act on the message;
select the first communication protocol or the second communication protocol for communication with the at least one further network device in accordance with the power state of the at least one further network device; and
act on the message in accordance with the determination and one of the functionalities associated with the at least one further network device,
wherein the circuitry is controllable to operate in the first power state when set to operate in the first power state, to operate in the second power state when set to operate in the second power state, to receive a command from another network device to switch from the second power state to the first power state and, in response to the command, to switch from the second power state to the first power state, and wherein the circuitry is configured to receive the message regardless of whether the circuitry is operating in the first power state or the second power state, the method comprising:

by the proxy network device:

requesting and/or being notified of data from others of said at least two network devices of the sub-network relating to general device information and/or the functionality of the respective network device and storing said data; and by the proxy network device:

submitting data in response to a request from a network device of the overall network addressed to any one of the at least two network devices of the sub-network.

* * * * *